United States Patent [19]
Santicchi

[11] Patent Number: 5,927,475
[45] Date of Patent: Jul. 27, 1999

[54] AUTOMATIC SYSTEM FOR DETECTING THE POSITION OF ITEMS LOADED ON A CONVEYOR BELT AND THE CONVEYOR BELT FOR ACTUATION OF THE PROCESS

[75] Inventor: Augusto Santicchi, Perugia, Italy

[73] Assignee: Metalprogetti di Santicchi Augusto & C.-S.N.C, Italy

[21] Appl. No.: 08/805,996

[22] Filed: Feb. 24, 1997

[30] Foreign Application Priority Data

Mar. 11, 1996 [IT] Italy ................... AN96A0005

[51] Int. Cl.⁶ ................................ B65G 43/00
[52] U.S. Cl. ..................... 198/502.3; 198/464.2; 198/464.1
[58] Field of Search ............... 198/502.3, 358, 198/464.1, 464.2, 349.5, 571, 572, 349.9

[56] References Cited

U.S. PATENT DOCUMENTS

| | | |
|---|---|---|
| 2,778,504 | 1/1957 | Byrne ................. 198/502.3 |
| 3,055,481 | 9/1962 | Austin ................. 198/502.3 |
| 3,491,903 | 1/1970 | Hedrick et al. .......... 198/349.8 |
| 3,743,090 | 7/1973 | Brown et al. ........... 198/349.9 |
| 3,880,298 | 4/1975 | Habegger et al. ........ 198/349.95 |
| 4,239,435 | 12/1980 | Weiss et al. ............ 414/136 |
| 4,832,181 | 5/1989 | Rugbab et al. .......... 198/502.3 |
| 4,907,699 | 3/1990 | Butcher et al. ......... 198/349.95 |
| 5,072,822 | 12/1991 | Smith .................. 198/358 |
| 5,573,101 | 11/1996 | Ouwejan ............... 198/358 |
| 5,660,261 | 8/1997 | Speckhart et al. ....... 198/358 |
| 5,799,769 | 9/1998 | Heer et al. ............ 198/349 |

FOREIGN PATENT DOCUMENTS 0 336 714  10/1989  European Pat. Off.
0 517 677  12/1992  European Pat. Off.

Primary Examiner—William E. Terrell
Assistant Examiner—Khoi H. Tran
Attorney, Agent, or Firm—Leonard Bloom

[57] ABSTRACT

This invention concerns an operating system with relevant actuation plant for automatically detecting the loading position of a clothing item previously identified and loaded at random at any of the loading stations of a conveyor belt.

1 Claim, 1 Drawing Sheet

AUTOMATIC SYSTEM FOR DETECTING THE POSITION OF ITEMS LOADED ON A CONVEYOR BELT AND THE CONVEYOR BELT FOR ACTUATION OF THE PROCESS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This patent application concerns a system for automatically detecting the position of items loaded on a conveyor belt and the conveyor belt for actuating the process.

2. Description of the Related Art

It is common knowledge that particularly practical conveyor belts today exist on the market provided with an overhead belt with windows in which the items to convey or sort are hooked, supported and conducted in a bearing structure consisting of metal pipes.

These plants have an electronic control unit which identifies both the items as they are loaded and each hooking window along the conveyor belts; by combining these two sets of data, said systems can constantly identify which particular item occupies a specific window of the conveyor belt.

This data is in fact essential to the systems for the successive automatic and accurate unloading of a particular item from the relevant conveyor belts, according to the orders received.

It should be noted however that in these conventional systems the identification and loading phase of the items into each specific window on the conveyor belt is particularly complicated.

The operator must in fact firstly identify the item to load by means of an optical sensing device which reads the bar code allocated to the item and then transmit a request to the system to load the item; on the basis of this request, the system stops with an empty window in front of a loading station, into which the operator hooks the item.

As mentioned above, the system associates the code of a particular item to the specific window into which the item is loaded; in particular, this is possible in that the electronic control unit in the system detects, as from a reference window on the belt identified conventionally with the number of zero, the progressive number of each window transiting at the loading station.

It follows that these systems, in terms of the principle adopted of associating a specific item to a specific window, are characterised in that the same identify the window to which a particular item is to be hooked even before the item itself has been loaded.

The consequence of this principle is that the operator is forced to load each item into that window as determined in advance by the system's control unit; the fact that the window stops at the loading station allows the operator to check the window selected by the control unit for a particular item.

From a practical point of view, the operator generally identifies the loading window by means of a display that indicates the number of the pre-selected window (if all the windows of the belt are numbered) or, alternatively, the pre-selected window is stopped in front of a reference index.

The intermittent feed of the conveyor belt, which is necessary to load the items as required, is in fact the major inconvenient of existing systems and substantially limits the operating speed.

Moreover, this inconvenient is particularly penalising in the case of those systems with several loading stations manned by the different operators; in this case the stops of the conveyor belt are extremely frequent in that each loading operator can autonomously stop the belt.

BRIEF SUMMARY OF THE INVENTION

The purpose of this invention is to improve the operating modalities, especially the speed of the conveyor belts in question; this has in particular been attained by introducing a detection system which on one hand permits the control unit in the system to recognise which item is hooked to a specific window of the conveyor belt and on the other permits loading the items randomly on the conveyor belt and above all, without stopping the feed.

The principle adopted to obtain this result is completely contrary to that used to date on the conventional systems; while in the past each specific loading position of a specific item (in particular each window of the belt) was identified before the item was loaded—now—according to this inventive principle—the specific loading position of an item is identified only if, and always after, an item has been loaded in the position in question.

The adoption of the principle for identifying the individual items with respect to the relevant loading positions is doubly advantageous from an operating point of view; not only does it eliminate the need to stop the conveyor belt periodically but it also substantially simplifies and speeds up the work of the operators who load the items since these can now load the items in any empty window without having to follow the pre-established indications of the system control unit.

To actuate this inventive idea, it is necessary to realise a conveyor belt having a sensor downstream of each loading station, to establish if the various windows of the belt moving in front of the same are occupied or empty, in other words if an item has been loaded in the same or otherwise.

Moreover the system must nonetheless be provided with an optical sensing device for the identification of the bar codes on the item to be loaded on the conveyor belt, as well as a conventional control unit to establish the progressive number of each window transiting in front of the sensor.

It follows that the electronic system of the system according to the invention firstly identifies and memorises the code of the item loaded into a specific window and only after the window has passed below the sensor installed at the exit of the loading station, does it verify that the window has in fact been loaded and thus reads the identification number associating the same to the identification code of the item.

Even if this description refers, for the sake of convenience, to an overhead belt conveyor with windows, it is obvious that this inventive idea can easily and directly be applied to conveyor belts with different conveyor means, provided it is possible to distinguish and evidence the individual loading position on said conveyor means.

In this sense, the inventive idea is undoubtedly applicable to belt, chain or screw conveyor belts; in other words, conveyor means on which it is extremely simple to divide the individual loading positions.

For major clarity the description of the invention continues with reference to the enclosed drawings intended for purposes of illustration and not in a limiting sense where FIG. 1 is a schematic view of a section of the conveyor belt with two separate loading stations.

BRIEF DESCRIPTION OF THE DRAWINGS

The system shown purely for purpose of illustration in FIG. 1 is an overhead belt type conveyor with windows (1) used to transport clothing items on hangers.

DETAILED DESCRIPTION OF THE INVENTION

Figure 1:
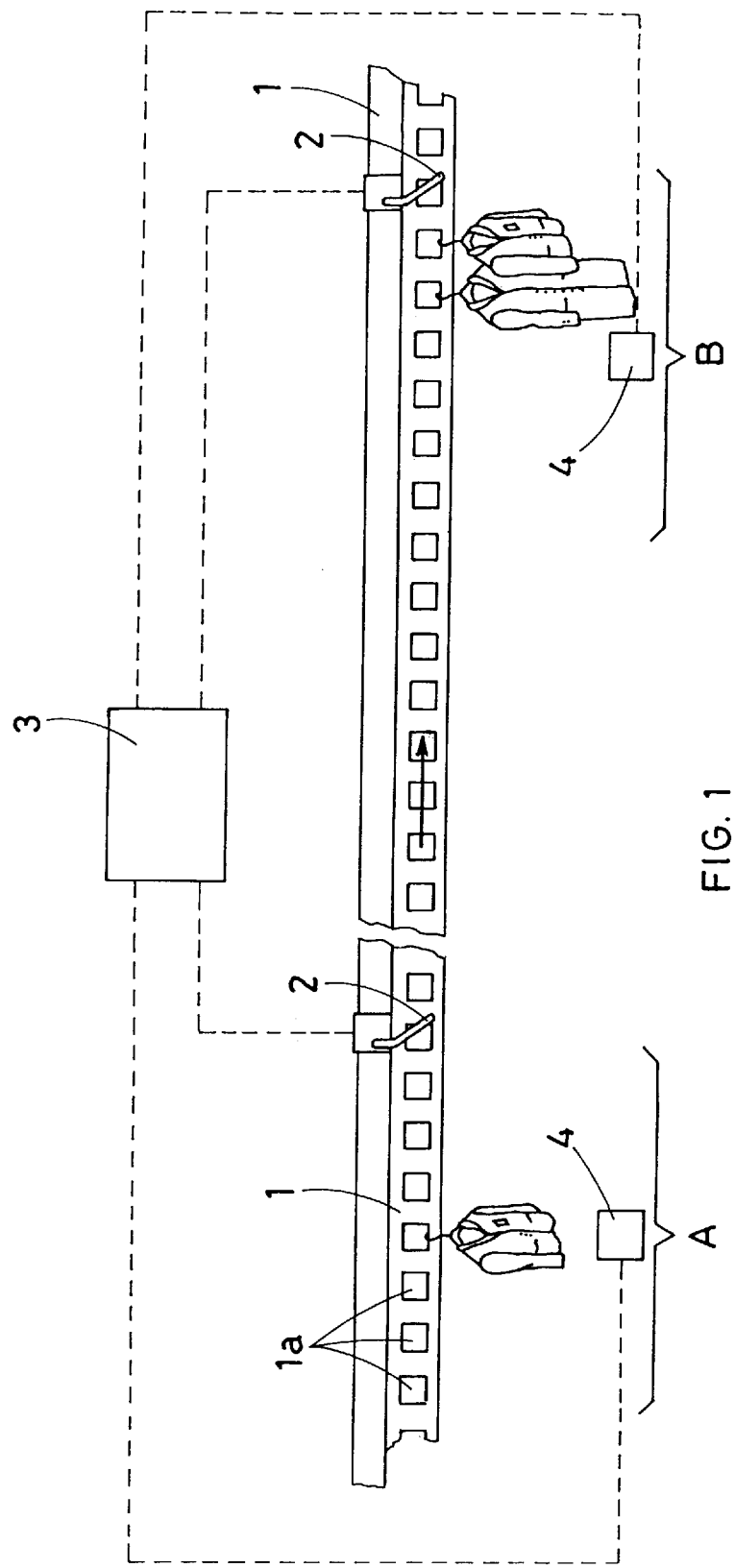

This system is characterised in that the exit of each of the two loading stations (A, B) is provided with a sensor (2) which verifies if the windows (1a) of the above conveyor belt with windows (1) are occupied or empty.

The sensor (2) shown in the figure is an electromechanical sensor in that it detects the presence of an item inside the window of the belt due to the interference of the item itself (as illustrated in the case of FIG. 1, this being the hook of the hanger) with a lever fitted to the same and subject to the action of a return spring: it being provided that said lever, at each interference with a hook, transmits a signal to the system control unit (3).

Each loading station being moreover provided with an optical sensing device (4) which reads the codes of the items ready for loading onto the conveyor belt; naturally each of these optical sensing devices (4) is also connected to the control unit (3) to which the same send the identification data of each item.

It follows that according to the same inventive idea, it would be possible to produce a system provided with a different type of sensor such as an optical sensing device which can nonetheless detect whether the various loading positions of the conveyor belt are occupied or otherwise, instead of the electromechanical sensor (2).

In like manner, for allocation of the identification codes to the various items, the cards with bar code and the use of the sensing device to read the codes on the same could be eliminated; in fact, different methods could be used for the allocation and identification of the codes to the items, such as the use of a keyboard for the allocation of the code to each item, manned by loaded operator, said keyboard being connected to the system control unit.

I claim:

1. A system for conveying a plurality of items on a conveyor belt and for automatically identifying a respective loading position of each of the items loaded on the conveyor belt, the system counting individual loading positions along the conveyor belt starting from an initial loading position set on an electronic control unit, the system further identifying an individual item of the plurality of items, the system comprising:

a specific identification for each item, said specific item identification being assigned to each item before the item is disposed in a respective loading position on the conveyor belt, a specific loading position identification assigned to each respective loading position in which a respective item has been disposed, at least one loading station, wherein the identified items are loaded onto the identified loading position on the conveyor belt, an exit from the at least one loading station, a sensor disposed at the exit of the at least one loading station, the sensor verifying the presence or absence of a respective identified item in each respective identified loading position as the conveyor belt moves the loading positions past the sensor, an electronic control unit receiving the specific item identifications, the specific loading position identifications together with a signal from the first sensor, wherein identified items may be randomly loaded into unoccupied loading positions and the system identifies a selected identified item and the identified loading position of said selected item enabling rapid recovery of the selected identified item from the conveyor belt, and wherein the items are articles of clothing hung on a hanger having a hook attached to the conveyor belt, the sensor being electromechanical and detecting the hook on the hanger.

\* \* \* \* \*